May 22, 1962 — F. J. LANGEMACK — 3,035,527
FLUENT FOOD DISPENSER
Filed Feb. 9, 1960 — 2 Sheets-Sheet 1
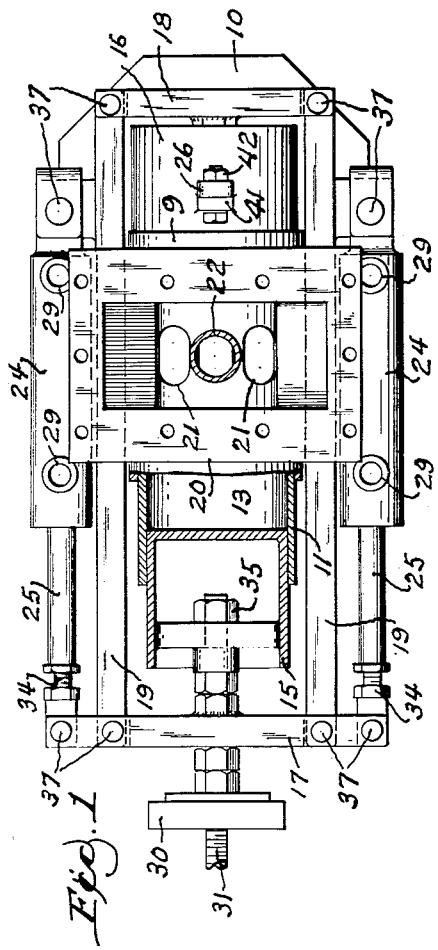
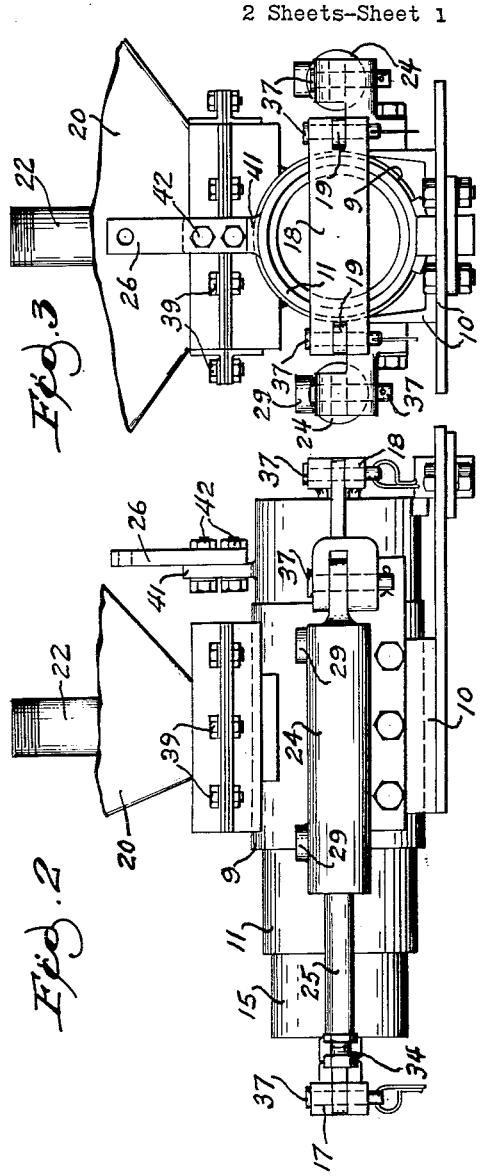
INVENTOR.
F. J. LANGEMACK
BY
Lieber, Lieber & Nilles
ATTORNEYS May 22, 1962 F. J. LANGEMACK 3,035,527
FLUENT FOOD DISPENSER
Filed Feb. 9, 1960 2 Sheets-Sheet 2
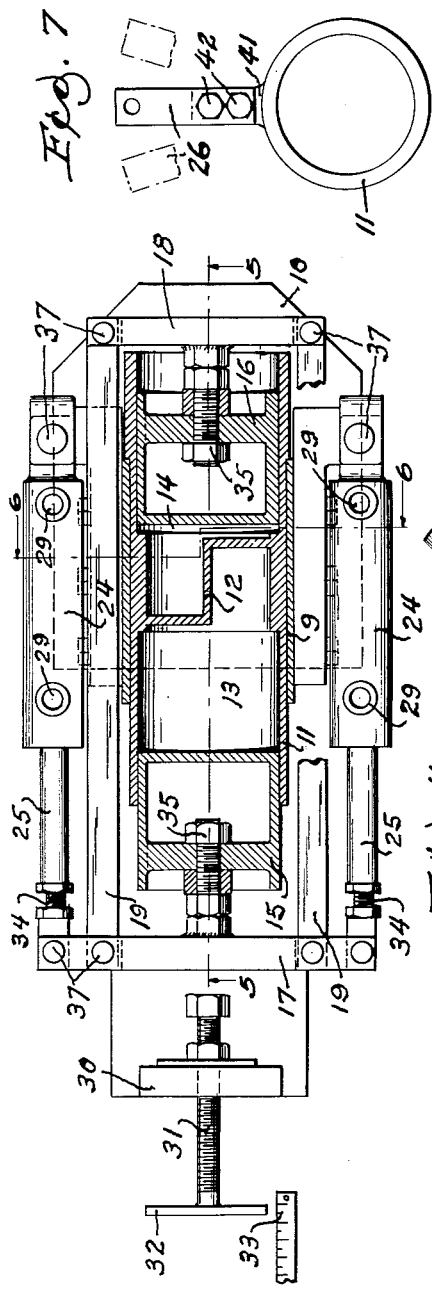
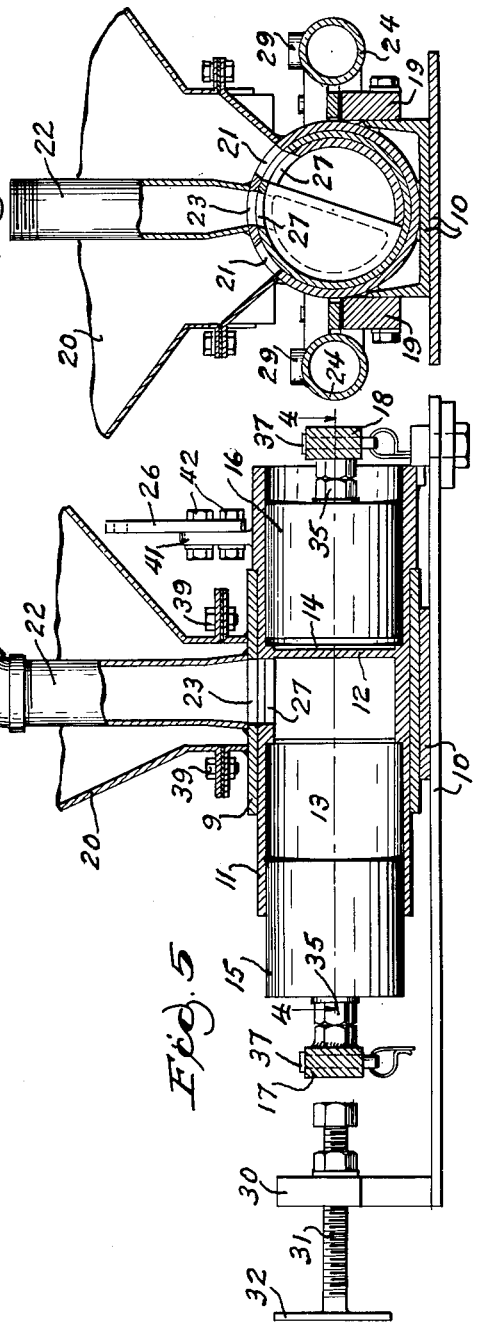
INVENTOR.
F. J. LANGEMACK
BY
Lieber, Lieber & Nilles
ATTORNEYS

United States Patent Office 3,035,527
Patented May 22, 1962

3,035,527
FLUENT FOOD DISPENSER
Franklyn Joseph Langemack, 1605 S. Calhoun Road,
Milwaukee, Wis.
Filed Feb. 9, 1960, Ser. No. 7,704
8 Claims. (Cl. 103—163)

The invention relates generally to improvements in the art of dispensing regulated quantities of fluent substances, and it relates more specifically to improvements in the construction and operation of devices for effecting delivery of measured batches of fluent material such as food from a source of supply to places of utilization thereof.

The principal object of the present invention is to provide an improved fluent material dispenser which is simple and compact in structure, and which is also conveniently manipulable to deliver successive accurately premeasured batches of the material.

As indicated in prior U.S. Patent No. 2,768,581, granted October 30, 1956, it has heretofore been proposed to deliver pre-measured batches of semi-fluent food such as mash mixed with fragments of solid material, to the feeding pans of confined animals such as mink, with the aid of a mechanism comprising inner and outer relatively rotatable upright cylinders the inner of which was divided by a single vertically reciprocable plunger into segregated displacement chambers which were alternately communicable with a source of food below the cylinders and with an upper discharge conduit, to deliver successive batches of the material through ports in the cylinder walls whenever the plunger was reciprocated and the inner cylinder was oscillated by a lever mounted above the cylinders.

While this prior food dispenser was quite successful in accomplishing its purpose, it was relatively complicated and costly to manufacture, and it was also rather difficult to manipulate in order to effect rapid dispensing of accurately pre-measured batches. Then too, this prior device could not be as rapidly and conveniently dismantled and reassembled, as desired for cleaning purposes, and certain parts lacked the necessary durability to handle heavy semi-fluent foods for prolonged periods without requiring extensive repairs.

It is therefore a more specific object of the present invention to provide an improved fluent food dispenser of the general type disclosed in the above identified patent, which obviates all of the difficulties encountered with this prior unit.

Another important object of this invention is to provide an improved fluent material feeder adapted to more effectively handle either relatively thin or heavy fluent substances, and to deliver accurately pre-measured successive batches thereof.

A further important object of the invention is to provide an improved unit for dispensing fluent products, which can be conveniently and quickly adjusted to vary the size of the pre-measured batches with utmost precision.

Still another important object of this invention is to provide a fluent food dispensing device, which is especially adapted to be mounted upon a transporting vehicle, and is capable of being readily manipulated from the driver's seat.

An additional object of the invention is to provide a food batch dispenser which can be quickly loaded and unloaded to reduce the feeding time to a minimum, and which may also be cleaned and sterilized with least loss of time.

Another important object of this invention is to provide a simplified and durable fluent material dispensing unit which can be manufactured and sold at moderate cost for diverse uses, and which delivers successive batches of uniform volume for each setting of the mechanism.

These and other objects and advantages of the invention will be apparent from the following description.

A clear conception of the features constituting the present improvements, and of the construction and operation of a commercial fluent material dispensing unit embodying the invention, may be had by referring to the drawings accompanying and forming a part of this specification in which like reference characters designate the same or similar parts in the various views.

FIG. 1 is a top view of one of the improved fluent food dispenser units, with a horizontal section taken longitudinally through one of the plunger sections and the adjacent end of the inner cylinder;

FIG. 2 is a side elevation of the same unit, with the upper part of the material supply hopper broken away;

FIG. 3 is an end view of the unit, with the upper portion of the supply hopper likewise broken away;

FIG. 4 is a view similar to that of FIG. 1, but with a horizontal longitudinal section taken centrally through both cylinders and the two plunger sections along the line 4—4 of FIG. 5 and also showing a fragment of the gauge for effecting variation of the plunger stroke;

FIG. 5 is a central longitudinal vertical section through the dispensing unit, taken along the line 5—5 of FIG. 4;

FIG. 6 is a transverse vertical section taken through the same unit along the line 6—6 of FIG. 4; and FIG. 7 is an end view of the oscillatory inner cylinder showing the extent to which this cylinder is oscillatable in dot-and-dash lines.

Although the invention has been described herein as being advantageously applicable for the purpose of delivering measured batches of semi-fluent food to animals such as mink, it is not intended to limit its use to such specific purposes; and it is also contemplated that descriptive terms employed herein be given the broadest possible interpretation consistent with the actual disclosure.

Referring to the drawings, the fluent material dispenser shown therein comprises in general, an outer normally stationary cylinder 9 secured to a base 10; a somewhat longer inner cylinder 11 oscillatably confined within the cylinder 9 and having therein an integral medial partition 12 forming internal displacement chambers 13, 14 opening toward the opposite open ends of the cylinders 9, 11; a plunger having axially spaced sections 15, 16 united by cross-bars 17, 18 and tie bars 19 and which are slidable respectively within the chambers 13, 14; a material supply hopper 20 mounted upon the outer cylinder 9 and being in open communication with a pair of ports 21 formed in this outer cylinder; a material dispensing conduit 22 secured to the outer cylinder 9 within the hopper 20 and communicating with a port 23 also formed in this cylinder between the ports 21; a pair of hydraulic double-acting rams each having a cylinder 24 secured to the base 10 and a movable piston 25 secured to the cross-bar 17 for simultaneously reciprocating the plunger sections 15, 16 within the chambers 13, 14; and a lever 26 for oscillating the inner cylinder 11 within the outer cylinder 9 to cause the ports 21, 23 of the latter to cooperate with a pair of ports 27 formed in the inner cylinder 11 in a manner to be later explained.

The base 10 which supports the batch measuring and food dispensing equipment may be mounted upon a tractor which also carries a power actuated pump and valve mechanism for actuating the hydraulic rams to alternately admit liquid under pressure through inlets 29 in the cylinder 24 simultaneously against the corresponding faces of the two pistons 25 to thereby reciprocate the plunger sections 15, 16. Such hydraulic control mechanism is well known, but it is desirable when the apparatus is mounted upon a self-propelled tractor to have the controls as well as the inner cylinder oscillating lever 26 located within easy reach of the tractor operator in order to save time.

The outer cylinder 9 may be firmly permanently attached within a channel portion of the base 10 in any suitable manner as shown in FIG. 6, and this base is provided at one end with a fixed upstanding projection 30 which carries an adjustable stop 31 one end of which is engageable with the cross beam 17 and the opposite end of which is provided with a disk 32 cooperable with a fixed calibrated gauge 33, while its medial portion has screw thread coaction with the stop 31 as depicted in FIG. 4. The pistons 25 of the hydraulic rams have their outer ends adjustably connected to the extreme ends of the cross bar 17 by screw and nut assemblages 34 and the two plunger sections 15, 16 are adjustably attached to the medial portions of the cross bars 17, 18 respectively by means of similar screw and nut assemblages 35, so that the stroke of the plunger sections 15, 16 can be accurately adjusted with the aid of the adjustable stop 31 and the assemblages 34, 35.

The partition 12 which is permanently mounted within the medial portion of the inner cylinder 11, is Z-shaped so that one of the ports 27 is in open communication with the displacement chamber 13 within which the plunger section 15 is reciprocable by the cross bar 17, while the other port 27 is likewise in open communication with the displacement chamber 14 within which the other plunger 16 is reciprocable by the other cross bar 18. Since the cross bars 17, 18 are interconnected by the tie beams 19, the two piston sections 15, 16 will simultaneously reciprocate in opposite directions within their confining chambers 13, 14 respectively whenever the ram pistons 25 are reciprocated within their fixed cylinders 24. However, in order to permit convenient and rapid cleaning and sterilizing of the various parts, the bars and beams 17, 18, 19 are detachably interconnected by removable pins 37, and the inner cylinder 11 is longitudinally removable from within the fixed outer cylinder 10 when the cross bar 18 has been detached from the beams 19, as will be apparent from FIGS. 1 to 5 inclusive.

The material supply hopper 20 is also detachably secured to the uppermost medial portion of the outer stationary cylinder 9 by bolts 39 and should have considerable storage capacity, and the upright food delivery conduit 22 may be disposed centrally within the hopper 20 with its lower end attached to the cylinder 9 in open communication with the port 23, while its upper end may communicate with a dispensing nozzle through a pipe 40 and a flexible conduit as disclosed in my prior patent above referred to. The inner cylinder oscillating lever 26 may be detachably secured to a projection 41 attached to the inner cylinder 11 beyond the end of the outer cylinder 9, by bolts 42 as shown in FIGS. 1, 2, 3 and 5, and the inner cylinder 11 together with the lever 26 may be withdrawn longitudinally from within the outer cylinder upon removal of the cross beam 18 with its plunger section 16.

When the improved fluent material dispenser has been properly constructed and assembled as above described, and the unit has been mounted upon a suitable tractor provided with a hydraulic pump and controls, its normal operation is as follows. When the hopper 20 has been supplied with the food, the unit may be transported to the successive feeding pans and a predetermined quantity of the material may be delivered from the hopper 20 to each pan through the discharge conduit 22 and the delivery pipe 40 and nozzle communicating therewith, either by discharging only one measured batch from either of the displacement chambers 13, 14 or by discharging several of such batches in rapid succession.

With the lever 26 thrown from central or inactive position as shown in FIGS. 1, 2, 3 and 7, toward the left, the port 21 will be connected with the port 27 of the chamber 13 and the plunger section 15 of this chamber may then be moved by the hydraulic rams toward the left as viewed in FIG. 5 thus quickly filling the chamber 13 with material delivered by gravity and suction from within the hopper 20. At the same time, a batch of the material previously fed in like manner into the chamber 14 will be delivered by the other plunger section 16 through the communicating ports 27, 23 and through the conduit 22 to the place of utilization. Then when the direction of movement of the plunger sections 15, 16 is reversed, while the lever 26 is thrown to the extreme right as viewed in FIG. 7, the measured batch of material will be discharged from the chamber 13 and a fresh batch will be drawn into the chamber 14, and this action may be continued until all of the material has been removed from the hopper 20 and dispensed through the conduit 22.

When the hopper 20 has been emptied and it is desider to discontinue use of the dispensing unit, the entire assemblage may be quickly dismantled for cleaning and sterilization. And when it is desired to re-assemble the unit, this may also be done, and both the dismantling and the re-assembly may be accomplished by merely removing and re-inserting the pins 37. The volume of the batches measured by the plunger sections 15, 16 can be conveniently varied with utmost precision with the aid of the adjustable stop 31 which may be locked in adjusted position by the nut coacting with the stop threads and with the base projection 30. The throw of the lever 26 is also limited by stops on the base 10, and the horizontal disposition of the cylinders 9, 11 permits convenient loading of the hopper 20 while the disposition of this hopper above these cylinders also causes gravity to assist the suction action in obtaining rapid and complete filling of the displacement chambers 13, 14.

It is also noteworthy, that by omitting the central conduit 22 and by connecting a material dispensing conduit with each of the ports 21 and with the port 23 constantly in open communication with the supply hopper 20, the operation of the hydraulic rams may be reversed to cause the plunger sections 15, 16 to discharge material from their respective displacement chambers 13, 14 through the adjacent ports 21 during each reverse movement of the plunger. This modification permits the unit to be used for two-man operation, and the amount of material dispensed will be doubled in proportion to the distances the apparatus is transported by the tractor.

The improved unit comprises few relatively simple but durable parts and is flexible in its adaptations, and the device has proven highly satisfactory and successful in actual use.

Various modes of carrying out the invention are contemplated as being within the scope of the following claims particularly pointing out and distinctly claiming the subject matter which is regarded as the invention.

I claim:

1. A fluent material dispenser comprising, an outer normally stationary cylinder having therein a central outlet port and an inlet port on each of the opposite sides of the outlet port, an inner cylinder oscillatably confined within said outer cylinder and being provided with a medial internal partition forming segregated displacement chambers opening toward the opposite ends of the cylinders and each having an independent port in the inner cylinder wall, a plunger having interconnected axially spaced sections slidable within said chambers, a material supply hopper alternately communicable with said chambers through said inlet and independent ports, a material dispensing conduit alternately communcable with said chambers through said outlet and independent ports, and means for reciprocating said plunger sections and for oscillating said inner cylinder to alternately admit material from said hopper into and for delivering the admitted material through said conduit from said chambers through said ports.

2. A fluent material dispenser comprising, an outer normally stationary cylinder having therein a central outlet port and a pair of inlet ports on opposite sides of the outlet port, an inner cylinder oscillatably confined within said outer cylinder and being provided with a medial internal partition forming segregated displacement chambers each provided with an independent port in the inner cylindrical wall, a plunger having simultaneously reciprocable sections slidable within said inner cylinder, a material supply hopper alternately communicable with said chambers through said inlet and independent ports, a material dispensing conduit alternately communicable with said chambers through said outlet and independent ports, and means for reciprocating said plunger and for oscillating said inner cylinder to transfer material through said ports from said hopper into said conduit.

3. A fluent material dispenser comprising, an outer fixed cylinder having therein an outlet port and an inlet port on each of the opposite sides of the outlet port, an inner cylinder oscillatably confined within said fixed cylinder and having therein a partition dividing the same into segregated displacement chambers each provided with an independent port in the inner cylinder wall, a plunger section reciprocable within each of said chambers, tie rods detachably interconnecting said plunger sections for producing simultaneous reciprocation thereof, means coacting with said rods to reciprocate said plunger sections, means for simultaneously admitting fluent material into one of said chambers through one of said inlet and one of said independent ports while discharging previously admitted material from the other chamber through said outlet and the other independent port, and means for effecting oscillation of said inner cylinder at the end of each reciprocating stroke of said plunger sections.

4. A fluent material dispenser comprising, an outer fixed cylinder having therein an outlet port and a pair of inlet ports on opposite sides of the outlet port, an inner cylinder oscillatably confined within said fixed cylinder and having therein a Z-shaped partition dividing the same into segregated displacement chambers each provided with an independent port in the inner cylinder wall, a plunger section reciprocable within each of said chambers, tie rods detachably interconnecting said plunger sections externally of said cylinders for producing simultaneous reciprocation thereof, hydraulic rams for reciprocating said plunger sections, said ports being cooperable to alternately admit fluent material into one of said chambers while discharging previously admitted material from the other, and a lever for effecting oscillation of said inner cylinder at the end of each reciprocating stroke of said plunger sections by said rams.

5. A fluent material dispenser comprising, an outer fixed horizontal cylinder having therein an outlet port and several inlet ports, an inner cylinder oscillatably confined within said fixed cylinder and being divided by a medial partition into segregated displacement chambers each provided with an independent port in the inner cylinder wall, a plunger section reciprocable within each of said chambers, said sections being interconnected for simultaneous reciprocation, a hopper located above said cylinders and having therein a discharge conduit alternately communicable with said chambers through said outlet port and one of said independent ports to alternately conduct fluent material from within each of said chambers while other material is being fed from said hopper through one of said inlet ports and the other of said independent ports into the other chamber, and means for oscillating said inner cylinder at the end of each reciprocating stroke of said plunger sections.

6. A fluent material dispenser comprising, an outer fixed horizontal cylinder having therein an outlet port and several inlet ports, an inner cylinder oscillatably confined within said fixed cylinder and being divided by a medial partition into segregated displacement chambers each provided with an independent port in the inner cylinder wall, a plunger section reciprocable within each of said chambers, said sections being detachably interconnected for simultaneous reciprocation by connecting rods disposed externally of the cylinders, a hopper located above said cylinders and being alternately communicable with said chambers to alternately feed fluent material by gravity into the chambers through said inlet and one of said independent ports, a discharge conduit rising from within said hopper for conducting material from within each of said chambers through said outlet and the other independent ports while said material is gravitating from said hopper into the other chamber, and means for oscillating said inner cylinder at the end of each reciprocating stroke of said plunger sections.

7. A fluent material dispenser comprising, a base, an outer horizontal cylinder secured to said base and having therein an outlet port and several inlet ports, an inner cylinder confined within said outer cylinder and having therein a central partition dividing the inner cylinder into segregated chambers each having an independent port communicating therewith, a plunger section reciprocable within each of said chambers, tie rods interconnecting said sections externally and on opposite sides of the cylinders, means cooperating with said tie rods to simultaneously reciprocate said plunger sections, a hopper mounted upon said outer cylinder for feeding fluent material into said chambers through said inlet and independent ports, and a discharge conduit also mounted upon said outer cylinder for delivering said fluent material from within said chambers through said outlet and independent ports, said inner cylinder being longitudinally removable from one end of said outer cylinder and said plunger sections being detachable from said tie rods.

8. A fluent material dispenser comprising, a base, an outer horizontal cylinder secured to said base and having therein an outlet port and several inlet ports, an inner cylinder communicable through said ports with and confined within said outer cylinder and having therein a central partition dividing the inner cylinder into segregated chambers, a plunger section reciprocable within each of said chambers, tie rods interconnecting said sections, hydraulic rams cooperating with said tie rods to simultaneously reciprocate said plunger sections, a hopper mounted above said outer cylinder for feeding fluent material into said chambers through said inlet ports, and an upright discharge conduit also mounted upon said outer cylinder within said hopper for delivering said fluent material from within said chambers through said outlet port, said inner cylinder being longitudinally removable from one end of said outer cylinder and said plunger sections being detachable from said tie rods.

References Cited in the file of this patent

UNITED STATES PATENTS 2,776,626　　Bowman _____ Jan. 8, 1957

FOREIGN PATENTS 424,673　　Great Britain _____ Feb. 26, 1935